(12) United States Patent
Ziaylek et al.

(10) Patent No.: US 8,152,123 B2
(45) Date of Patent: Apr. 10, 2012

(54) TANK RETAINING APPARATUS

(75) Inventors: Michael P. Ziaylek, Yardley, PA (US);
W. Brian McGinty, Huntingdon Valley, PA (US)

(73) Assignee: Michael P. Ziaylek, Yardley, PA (US)

( * ) Notice: Subject to any disclaimer, the term of this patent is extended or adjusted under 35 U.S.C. 154(b) by 258 days.

(21) Appl. No.: 12/589,862

(22) Filed: Oct. 29, 2009

(65) Prior Publication Data
US 2010/0133404 A1    Jun. 3, 2010

Related U.S. Application Data

(60) Provisional application No. 61/199,321, filed on Nov. 14, 2008.

(51) Int. Cl.
*A47K 1/08*    (2006.01)

(52) U.S. Cl. .................... 248/312; 248/311.2

(58) Field of Classification Search .......... 248/313, 248/311.2, 312, 312.1, 316.1, 316.3; 297/188.04; 220/668, 588–591
See application file for complete search history.

(56) References Cited

U.S. PATENT DOCUMENTS

| | | | |
|---|---|---|---|
| 2,278,232 A | 3/1942 | Anderson | |
| 2,431,698 A | 12/1947 | Lombard | |
| 3,667,714 A | 6/1972 | Ziaylek, Jr. | |
| 3,780,972 A | 12/1973 | Brodersen | |
| 4,304,383 A | 12/1981 | Huston | |
| 4,586,687 A | 5/1986 | Ziaylek, Jr. | |
| 4,848,714 A | 7/1989 | Ziaylek, Jr. et al. | |
| 4,997,157 A | 3/1991 | Sweeny | |
| 5,213,392 A | 5/1993 | Bostrom et al. | |
| 5,314,233 A | 5/1994 | Bostrom et al. | |
| 5,354,029 A | 10/1994 | Ziaylek, Jr. et al. | |
| 5,681,080 A | 10/1997 | Pond et al. | |
| 5,803,544 A | 9/1998 | Block et al. | |
| 5,934,749 A | 8/1999 | Pond et al. | |
| 6,220,557 B1 | 4/2001 | Ziaylek et al. | |
| 6,543,736 B2 | 4/2003 | Field | |
| 6,601,923 B2 | 8/2003 | Pond et al. | |
| 6,655,745 B2 | 12/2003 | Fohrenkamm et al. | |
| 6,702,242 B1 | 3/2004 | Ziaylek, Jr. et al. | |
| 6,883,766 B1 | 4/2005 | Ziaylek et al. | |
| 6,926,243 B1 | 8/2005 | Ziaylek et al. | |
| D562,116 S * | 2/2008 | Ziaylek et al. | D8/373 |
| 7,963,597 B2 * | 6/2011 | Bostrom et al. | 297/188.04 |
| 7,975,978 B2 * | 7/2011 | Ziaylek | 248/311.3 |
| 2003/0038525 A1 * | 2/2003 | Pond et al. | 297/452.29 |
| 2003/0047971 A1 * | 3/2003 | Fohrenkamm et al. | 297/188.04 |
| 2007/0187414 A1 | 8/2007 | Lackore | |
| 2009/0045657 A1 * | 2/2009 | Bostrom et al. | 297/188.04 |
| 2009/0250582 A1 * | 10/2009 | Ziaylek | 248/312 |

* cited by examiner

*Primary Examiner* — Alfred J Wujciak, III
*Assistant Examiner* — Erin W Smith
(74) *Attorney, Agent, or Firm* — Sperry, Zoda & Kane (57) ABSTRACT

A tank retaining bracket having a rotating head for selectively receiving and securing a tank to the bracket having a mounting cup preferably of nylon which adapted to abut and hold a cylindrical tank in an inverted position in a positively engaging manner. The mounting cup includes an arcuate retaining surface and can easily replaced during normal maintenance. The mounting cup is attachable to the rotating head of the bracket frame of a positively engaging tank holder usable with cylindrical tanks such as self-contained breathing apparatus primarily for facilitating adjustability of positioning of retaining of the tank with respect to the mounting bracket. The body member is adjustably movable to a multiple of lateral directions such that it is firmly secured in place by a plurality of fasteners and engagement is further enhanced by a ridge on the rotating frame head and a mated engaging block on the mounting cup.

16 Claims, 7 Drawing Sheets

TANK RETAINING APPARATUS

The present utility application hereby formally claims priority of U.S. Provisional Patent application No. 61/199,321 filed Nov. 14, 2008 "MEMBER ATTACHABLE TO A ROTATABLE FRAME OF AN ADJUSTABLE POSITIVELY ENGAGING TANK HOLDER" filed by the same inventors as listed herein, namely, Michael P. Ziaylek and W. Brian McGinty. Said referenced provisional application is hereby formally incorporated by reference as an integral part of the present application.

BACKGROUND OF THE INVENTION

1. Field of the Invention

The present invention deals with the field of tank retaining brackets and, in particular those specific type of brackets which are adjustable to allow for usage in various modes with tanks of different sizes and/or configurations. These cylindrical tanks usually are used as part of a self-contained breathing apparatus often used by emergency personnel. These tanks are often mounted in an inverted manner with respect to walls or the seatbacks of emergency vehicles to facilitate quick access thereto for emergency personnel. The present invention provides a means for minimizing the maintenance requirements of suck brackets by providing an adjustably positionable nylon cup for abutting and holding the tanks in a positively engaging manner. The retaining cup is movable to a plurality of various positions as desired for the specific application of usage.

2. Description of the Prior Art

A number of designs have been patented which provide adjustability and positioning and/or increased work characteristics for holding brackets for tanks usually utilized by emergency personnel such as those utilized with a self-contained breathing apparatus such as shown U.S. Pat. No. 2,278,232 issued Mar. 31, 1942 to P. A. Anderson on a "Gas Installation Housing"; and U.S. Pat. No. 2,431,698 issued Dec. 2, 1947 to H. Lombard on a "Removable Mounting Installation"; and U.S. Pat. No. 3,667,714 issued Jun. 6, 1972 to T. Ziaylek, Jr. on a "Tank Support"; and U.S. Pat. No. 3,780,972 issued Dec. 25, 1973 to J. C. Brodersen on a "Mounting Apparatus For Gas Containers"; and U.S. Pat. No. 4,304,383 issued Dec. 8, 1981 to P. O. Huston on a "Bracket For Holding A Tank"; and U.S. Pat. No. 4,586,687 issued May 6, 1986 to T. Ziaylek, Jr. on an "Air Tank Support Of The Quick Release Type"; and U.S. Pat. No. 4,848,714 issued Jul. 18, 1989 to T. Ziaylek, Jr. et al on a "Mounting Plate With Rollers"; and U.S. Pat. No. 4,997,157 issued Mar. 5, 1991 to H. D. Sweeny and assigned to Swenco Limited on a "Multi-Purpose Canister Wall Bracket"; and U.S. Pat. No. 5,213,392 issued May 25, 1993 to John M. Bostrom et al on a "Seat Construction"; and U.S. Pat. No. 5,314,233 issued May 24, 1994 to John M. Bostrom et al on a "Seat Construction Having A Mechanism For Storing A Tank"; and U.S. Pat. No. 5,354,029 issued Oct. 11, 1994 to T. Ziaylek, Jr. et al on a "Quick Release Tank Support Bracket With Positive Locking Engagement Means"; and U.S. Pat. No. 5,681,080 issued Oct. 28, 1997 to George M. Pond et al and assigned to Seats, Inc. on a "Vehicle Seat For Person Wearing Self-Contained Breathing Apparatus"; and U.S. Pat. No. 5,803,544 issued Sep. 8, 1998 to Wayne R. Block et al and assigned to H.O. Bostrom Company, Inc. on a "Seat Construction With Removable Side Cushions"; and U.S. Pat. No. 5,934,749 issued Aug. 10, 1999 to George M. Pond et al and assigned to Seats, Inc. on a "Vehicle Seat With Removable Bolsters And Pivoting Headrest Members"; and U.S. Pat. No. 6,220,557 issued Apr. 24, 2001 to Michael P. Ziaylek et al and assigned to Michael P. Ziaylek, Theodore Ziaylek, Jr. and Theodore P. Ziaylek; and U.S. Pat. No. 6,543,736 issued Apr. 8, 2003 to Bradley J. Field and assigned to Pacific Safety Products Inc. on a "Quick Release Supporting Apparatus For A Canister"; and U.S. Pat. No. 6,601,923 issued Aug. 5, 2003 to George Pond et al and assigned to Seats Incorporated on an "Emergency Vehicle Seat With Integrated Seat Belt"; and U.S. Pat. No. 6,655,745 issued Dec. 2, 2003 to Jeremy A. Fohrenkamm et al and assigned to H.O. Bostrom Company, Inc. on an "Emergency Vehicle Seat With Integrated Seat Belt"; and U.S. Pat. No. 6,702,242 issued Mar. 9, 2004 to Theodore Ziaylek, Jr. et al on a "Releasable Tank Holding Assembly Securable To A Hollow Seat Back To Facilitate Detachable Securement Of A Tank Thereinto"; and U.S. Pat. No. 6,883,766 issued Apr. 26, 2005 to Michael Paul Ziaylek et al on a "Quick Release Mechanical Bracket"; and U.S. Pat. No. 6,926,243 issued Aug. 9, 2005 to Michael Paul Ziaylek et al on a "Mounting Bracket With An Ejection Means For Detachable Retaining Of A Cylindrical Tank Member"; and United States Publication No. 2007/0187414 published Aug. 16, 2007 to James Roger Lackore and assigned to Pierce Manufacturing Inc. on a "Tank Holder For A Vehicle".

SUMMARY OF THE INVENTION

The present invention provides a tank retaining apparatus designed for the purpose of selectively and positively engaging a cylindrical tank such as is a self-contained breathing apparatus in an inverted position with respect to environmental structure such as the interior walls of the passenger compartment of an emergency vehicle such as a fire truck. This tank retaining apparatus includes an adjustably positionable and easily replaced retaining cup of soft material which is designed to gently but firmly retain the tank in positive engagement with respect to the bracket while being capable of rotatable movement away from the tank receiving zone for allowing removal of the tank from the zone or placement of a new tank within the zone.

This tank retaining apparatus includes a bracket housing which defines a tank receiving zone therewithin for selectively receiving and retaining of a cylindrical tank positioned in inverted orientation. The apparatus further includes a lower mounting support for receiving the upper portion such as the neck area of an inverted cylindrical tank therein to facilitate selective retaining thereof within the tank receiving zone. The lower mounting support is positioned immediately below the tank receiving zone.

Furthermore the apparatus includes a rotatable head assembly rotatably mounted to the bracket housing at a position above the tank receiving zone for selectively engaging and retaining of an inverted cylindrical tank. The rotatable head assembly is rotatable between an opened position spatially disposed from the tank receiving zone to facilitate placement and removal of the cylindrical tank with respect to the zone and a closed position immediately adjacent the tank receiving zone positioned in abutment with a cylindrical tank positioned therein for positively retaining thereof with respect to the bracket apparatus.

The rotatable head assembly includes a rotatable head member preferably of aluminum which is rotatably secured to the bracket housing. This rotatable head member will preferably define a plurality of head apertures therein to facilitate detachable attachment with respect thereto. The rotatable head member will also preferably include a plurality of threaded steel inserts extending into each of the head apertures of the head member to minimize maintenance requirements normally prevalent with the use of softer metals such as aluminum.

The rotatable head member further preferably includes a first structural member extending longitudinally and a second structural member extending longitudinally therealong. This second structural member will preferably extend laterally outwardly from the first structural member to define a head mounting groove extending longitudinally therealong to facilitate detachable securement with respect thereto.

The rotatable head assembly further includes a retaining cup preferably made of nylon which is detachably attached to the rotating head member and is selectively engageable with respect to an inverted cylindrical tank positioned within the tank receiving zone for selectively retaining it. The retaining cup is adjustably attachable to the rotating head member at a plurality of different positions.

Furthermore the retaining cup includes a mounting block selectively attachable to the rotatable head member at a plurality of different positions. The mounting block preferably includes a plurality of mounting block apertures defined therein to facilitate detachable attachment thereof with respect to the rotatable head member. The mounting block aperture is preferably positioned to be capable of being brought into alignment with respect to the head apertures to further facilitate detachable attachment therebetween. Preferably the spacing between the head apertures and the mounting block apertures will present approximately one inch intervals. The rotatable head member also will preferably define more head apertures than the number of mounting block apertures defined in the mounting block of the retaining cup in order to provide adjustability in the lateral position of attachment of the retaining cup with respect to the rotating head member. The mounting block of the retaining cup will preferably be mated with and engageable with respect to the head mounting groove of the rotatable head member to further facilitate detachable attachment therebetween.

The retaining cup will also preferably include an arcuate retaining plate attached to the mounting block and possibly formed integrally therewith. The arcuate retaining plate will extends outwardly from the mounting block and will provide an abutment surface positionable in abutment with an inverted cylindrical tank positioned in the tank receiving zone for selectively retaining thereof therewithin.

The arcuate retaining plate of the retaining cup will preferably include an arcuate central section providing the abutment surface for selective abutment with a cylindrical tank for retaining thereof in inverted orientation within a tank receiving zone. This arcuate central section will provide this abutment surface for this purpose. The arcuate retaining plate will also preferably include a first wing section attached to the arcuate central section which extends outwardly therefrom. This first wing section will be less arcuate than the arcuate central section and will provide lateral structural strength to the arcuate retaining plate. Furthermore the arcuate retaining plate may include a second wing section attached to the arcuate central section which extends outwardly therefrom at a position spatially disposed from the position of the first wing section. This second wing section will preferably be less arcuate than the arcuate central section and will provide structural strength to the arcuate retaining plate.

The retaining cup will first preferably further include a plurality of fastening means which may be threaded which are adapted to extend through the head apertures of the rotatable head member and the mounting block apertures of the retaining cup in order to facilitate detachable attachment therebetween.

It is an object of the present invention to provide a member attachable to the rotatable frame of an adjustable positively engaging tank holder wherein the member itself can be made of a nylon material for better wear resistance.

It is an object of the present invention to provide a member attachable to the rotatable frame of an adjustable positively engaging tank holder wherein the member can be made of a nylon material for enhancing adjustability.

It is an object of the present invention to provide a member attachable to the rotatable frame of an adjustable positively engaging tank holder wherein the member includes a body with a tank receiving cup having a nylon surface to enhance wear resistance and facilitate adjustability of positioning of the tank relative to the tank holding bracket.

It is an object of the present invention to provide a member attachable to the rotatable frame of an adjustable positively engaging tank holder wherein a plurality of member apertures are defined in the member body and the plurality of frame apertures are defined in the rotating frame to facilitate adjustability in the relative positioning of the member body with respect to the rotating frame for various different applications.

It is an object of the present invention to provide a member attachable to the rotatable frame of an adjustable positively engaging tank holder wherein a plurality of machine screws are used as fasteners for detaching and re-attaching of the body member with respect to the rotating frame at various positions to enhance relative adjustable positioning therebetween.

It is an object of the present invention to provide a member attachable to the rotatable frame of an adjustable positively engaging tank holder wherein threaded steel inserts can be placed into the rotating frame at the location of each frame aperture to facilitate engagement of a fastening means with respect thereto.

It is an object of the present invention to provide a member attachable to the rotatable frame of an adjustable positively engaging tank holder wherein maintenance requirements are minimized.

It is an object of the present invention to provide a member attachable to the rotatable frame of an adjustable positively engaging tank holder wherein the number of moving parts is minimized.

It is an object of the present invention to provide a member attachable to the rotatable frame of an adjustable positively engaging tank holder wherein usage with various different shapes, sizes and configurations of tanks is made possible.

It is an object of the present invention to provide a member attachable to the rotatable frame of an adjustable positively engaging tank holder wherein the rotating frame includes a shoulder ridge engageable with a shoulder engaging block on the member body to facilitate engagement between the frame and the body.

It is an object of the present invention to provide a member attachable to the rotatable frame of an adjustable positively engaging tank holder wherein the amount of deflection of the concave tank receiving cup of the front member surface of the member body is minimized to provide a more secure and reliable construction.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

The present invention provides a tank retaining apparatus which includes a bracket housing means 12 designed to hold a cylindrical tank 10 therewithin in an inverted position. The bracket housing 12 defines a tank receiving zone therewithin and includes a lower mounting support 16 positioned immediately below the tank receiving zone 14 which is adapted to engage preferably the neck portion of the tank 10 when mounted in the inverted orientation. The lower mounting support 16 will be positioned immediately below the tank receiving zone 14 to facilitate holding of the tank 10 thereabove.

A rotatable head assembly 17 is pivotally secured with respect to the bracket housing 12. This pivotal connection can take a variety of different constructions, however the important aspect is that the rotatable head assembly is movable between an opened position 32 allowing removal or replacement of the tank within the tank receiving zone 14 and a closed position 34 firmly securing a cylindrical tank 10 in an inverted position within zone 14.

The rotatable head assembly will include a rotatable head member 18 which is preferably of aluminum and will preferably define a plurality of head apertures 19 therein spaced apart at approximately one inch from one another along the head member. This rotatable head member 18 itself is rotatable between the opened and closed positions 32 and 34 and includes a retaining cup 20 detachably secured thereto.

Retaining cup 20 is preferably of a nylon material and is detachably with respect to the rotating head member 18.

The configuration of the retaining cup 20 includes a mounting block 22 to facilitate securement with respect to the rotatable head member 14 and an arcuate retaining plate 24 which includes an abutment surface 26 therein adapted to abut and engage a cylindrical tank when positioned within the tank receiving zone 14 for fixedly securing said tank therewithin. The arcuate retaining plate 24 is detachably secured to the rotatable head member 18 and, as such, is rotatable therewith such that the abutment surface 26 of plate 24 is brought into abutment with the cylindrical tank 10 when the tank is positioned within the tank receiving zone 14. The arcuate retaining plate 24 is also movable along with the rotatable head member 18 when moved to the opened position 32 to disengage from a tank 10 positioned within the tank receiving zone 14 to allow removal thereof and replacement of a new tank within the zone.

One of the important characteristics of the present invention is in the ease of replacement of the retaining cup 20. For this purpose the retaining cup 20 will preferably define a plurality of mounting block apertures 23 defined within the mounting block 22 therein which are mated to the spacing of the apertures in the rotatable head apertures 19 in the rotatable head member 18. Preferably both the mounting block apertures 23 and the head apertures 19 will be spaced apart at approximately one inch from one another. A plurality of fastening means such as male threaded fasteners 28 will preferably be included which can extend through the mounting block apertures 23 and the head apertures 19 for facilitating detachable engagement of the mounting block 22 of the retaining cup 20 with respect to the rotatable head member 18.

Figure 1:
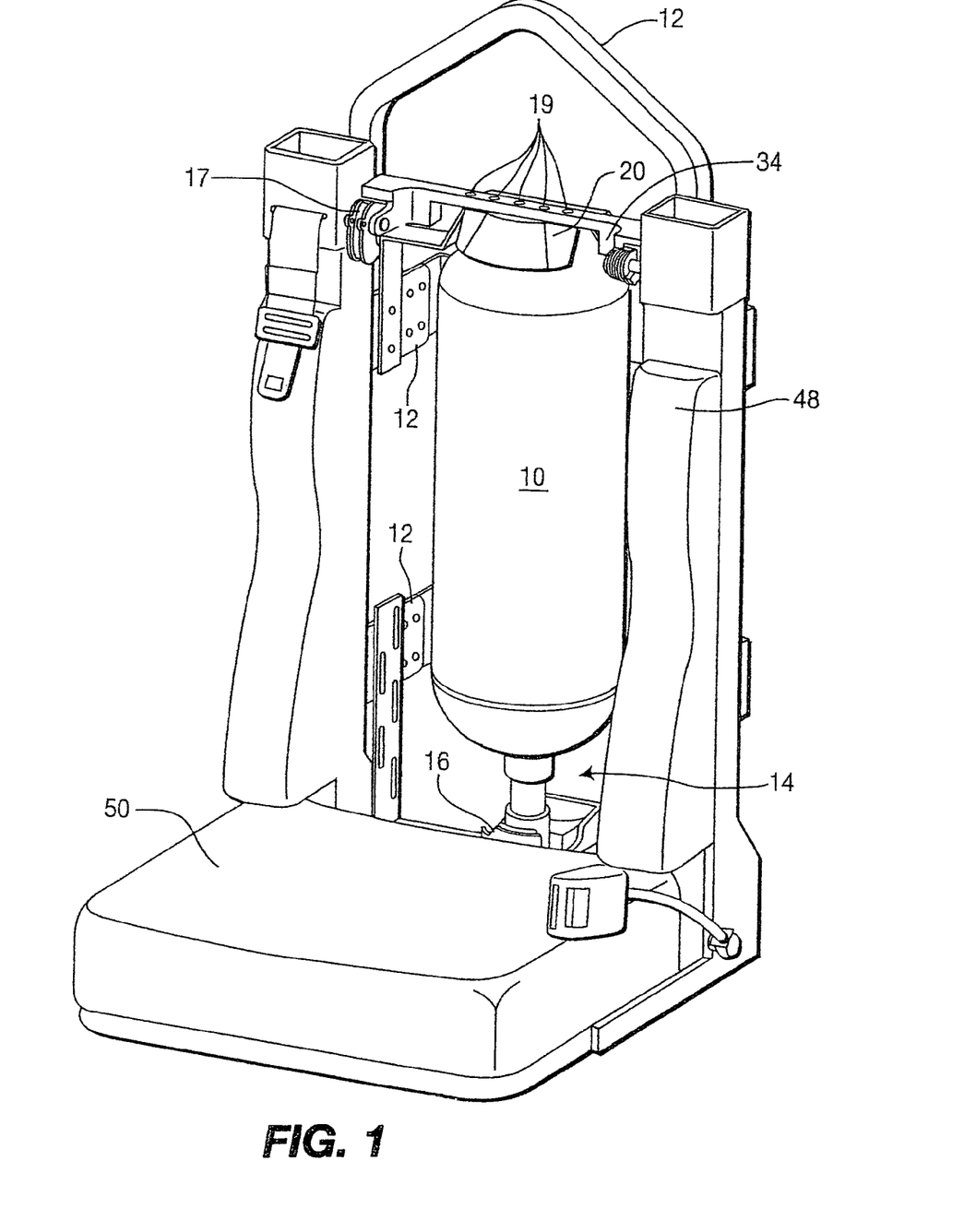
FIG. 1 is a three-quarter perspective illustration of an embodiment of the tank retaining apparatus of the present invention shown in the closed position with a tank positioned in the tank receiving zone.
Figure 2:
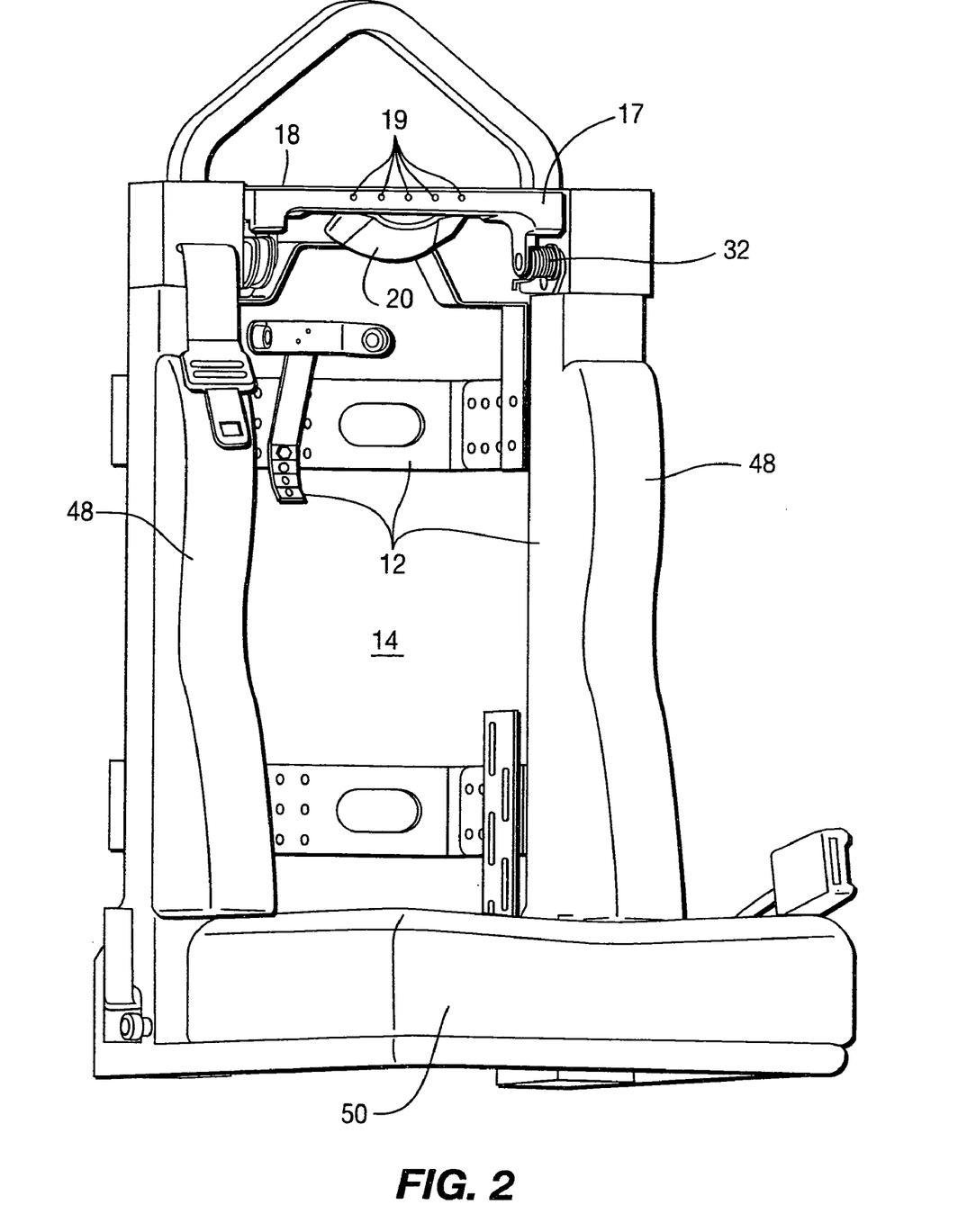
FIG. 2 is an illustration of the embodiment shown in FIG. 1 without a tank and showing the apparatus in the opened position.
Figure 3:
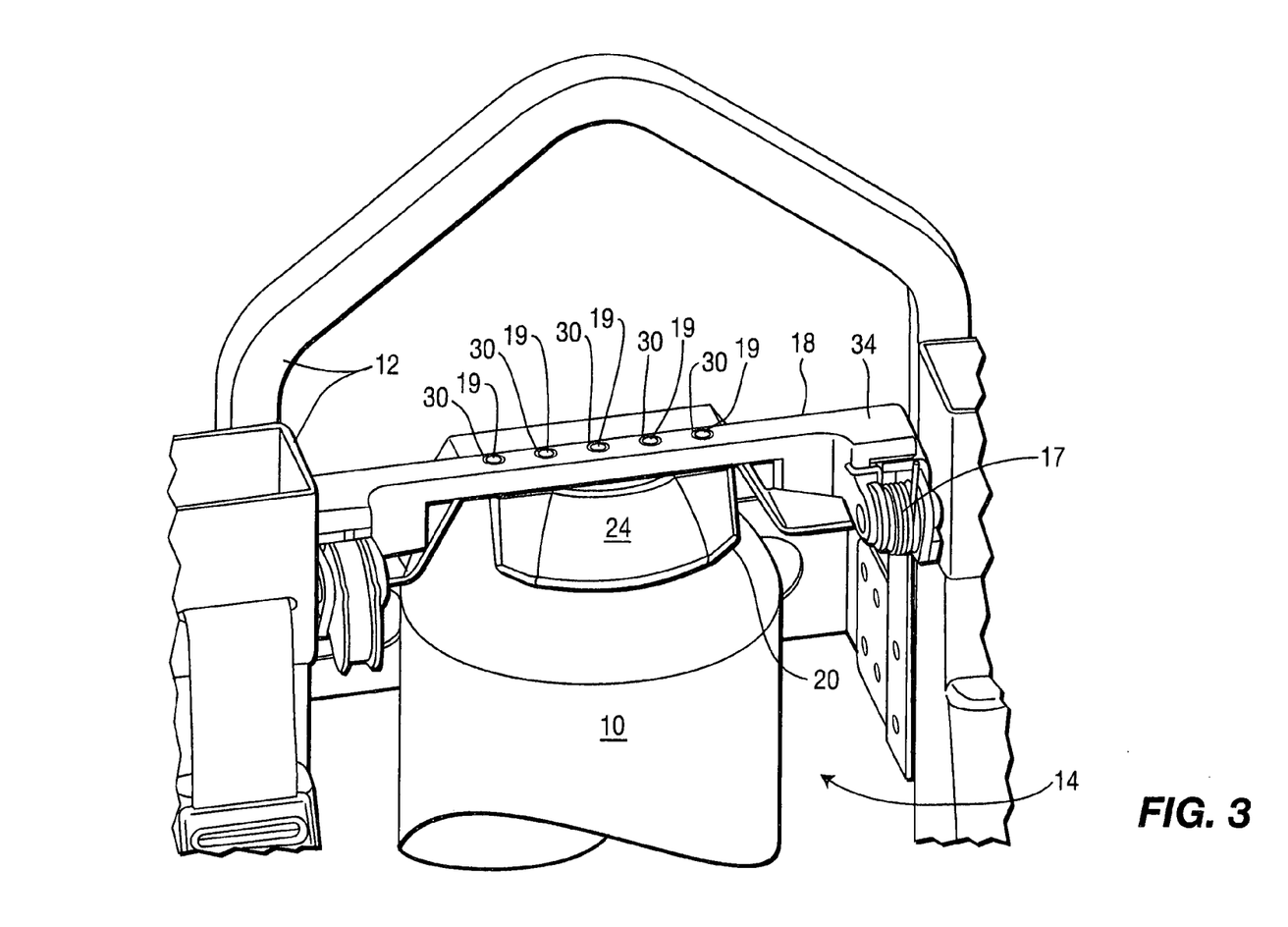
FIG. 3 is a close-up view of the upper portion of FIG. 1.
Figure 4:
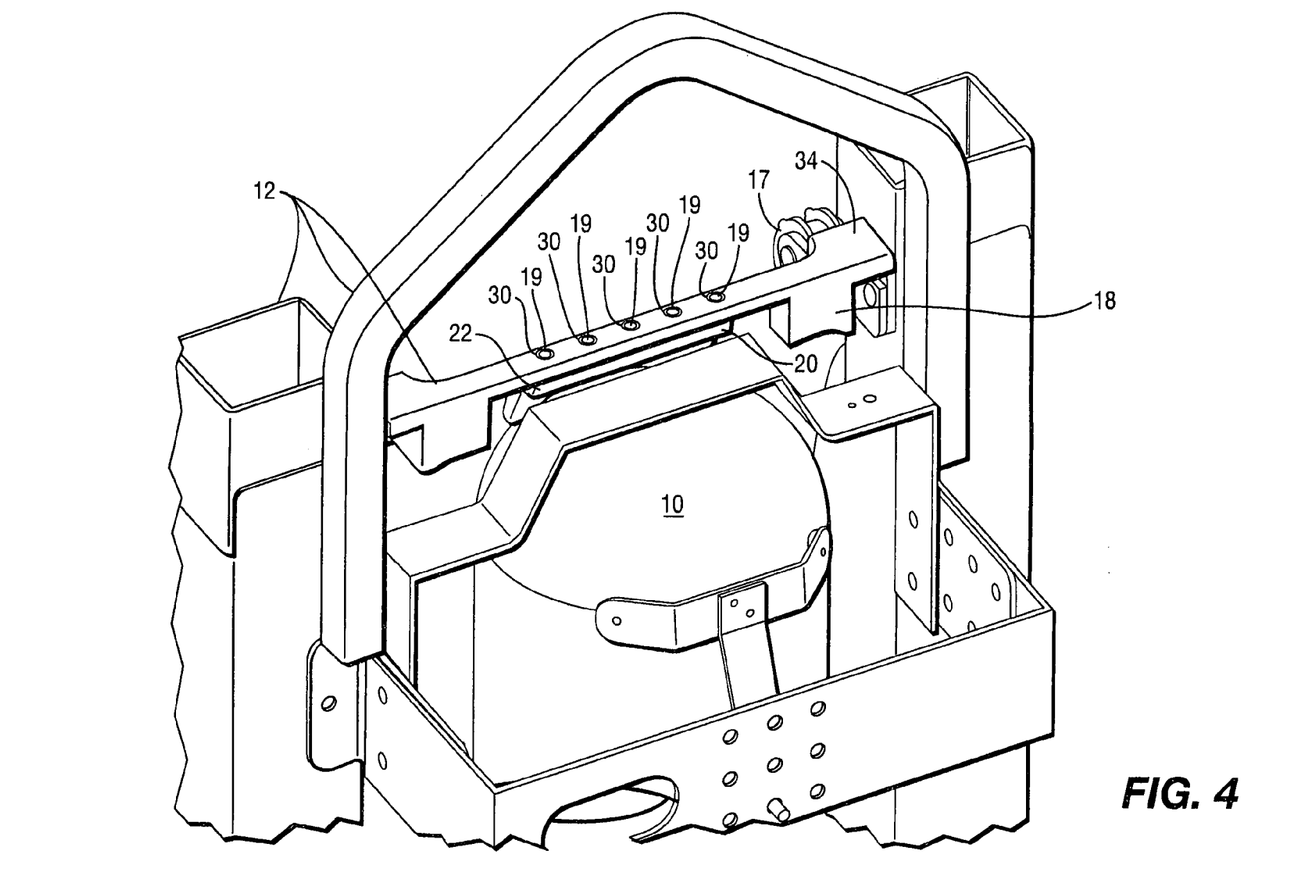
FIG. 4 is a view from the rear of the upper portion of FIG. 1 which is enlarged.
Figure 5:
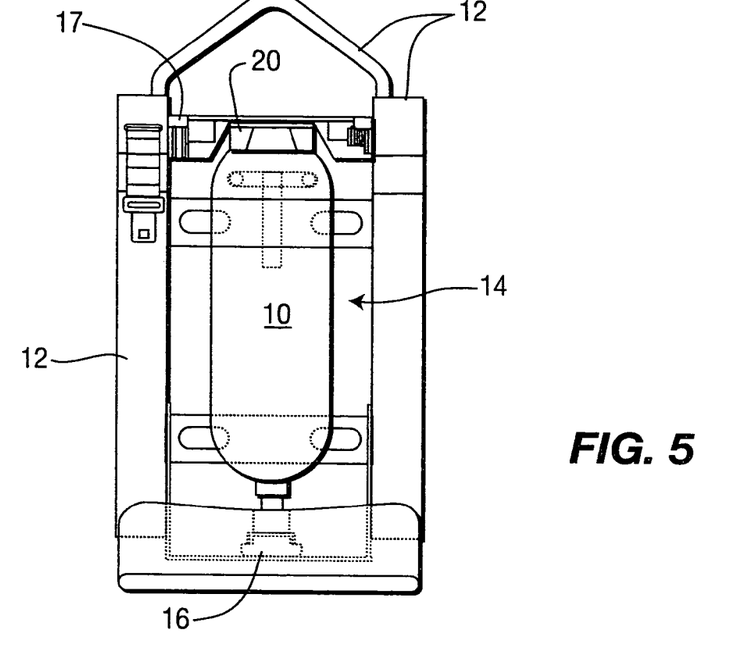
FIG. 5 is a front plan view of an embodiment of the apparatus of the present invention showing a tank in the closed position retained therewithin.
Figure 6:
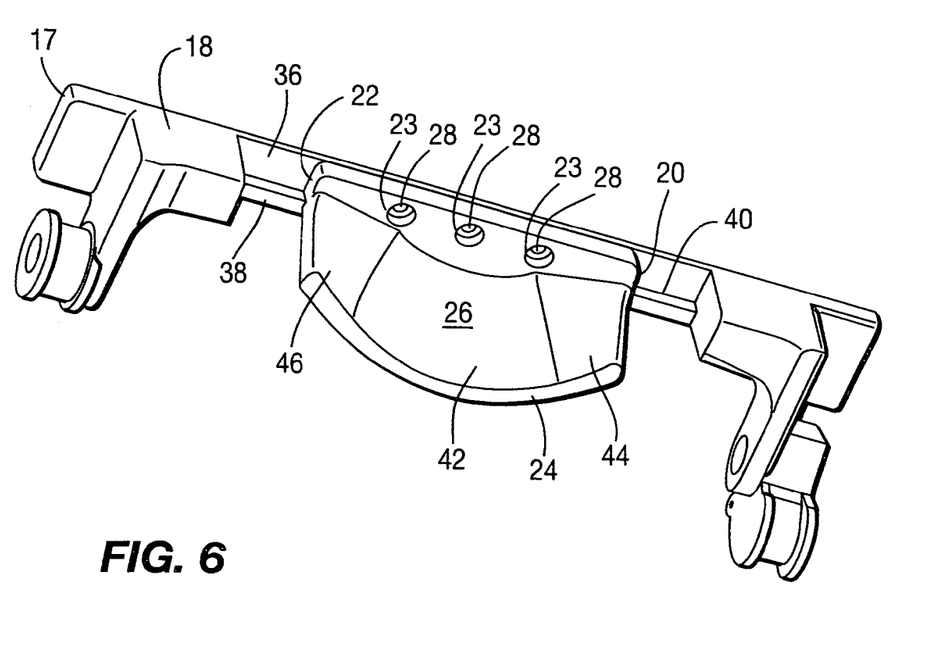
FIG. 6 is a view of the rear portion of the rotatable head assembly of an embodiment of the present invention.
Figure 7:
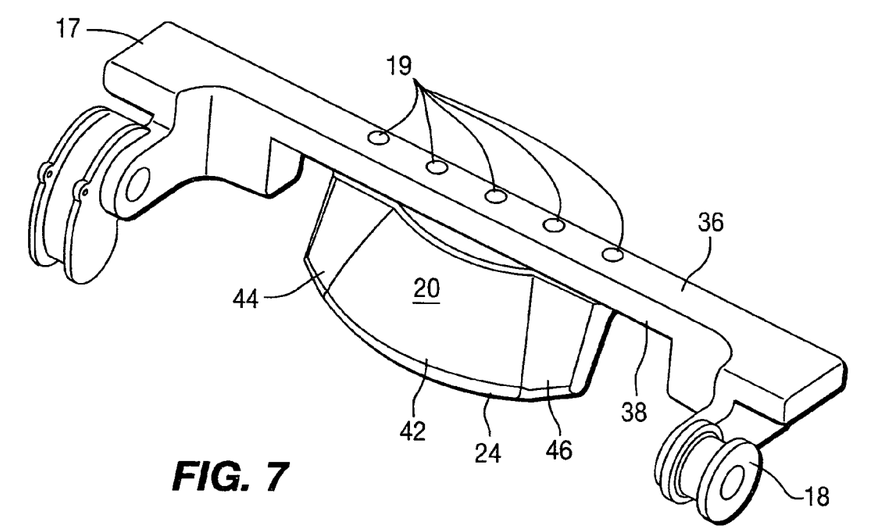
FIG. 7 is a front plan view of an embodiment of the rotatable head assembly of the present invention with the retaining cup shown secured in the central position.
Figure 8:
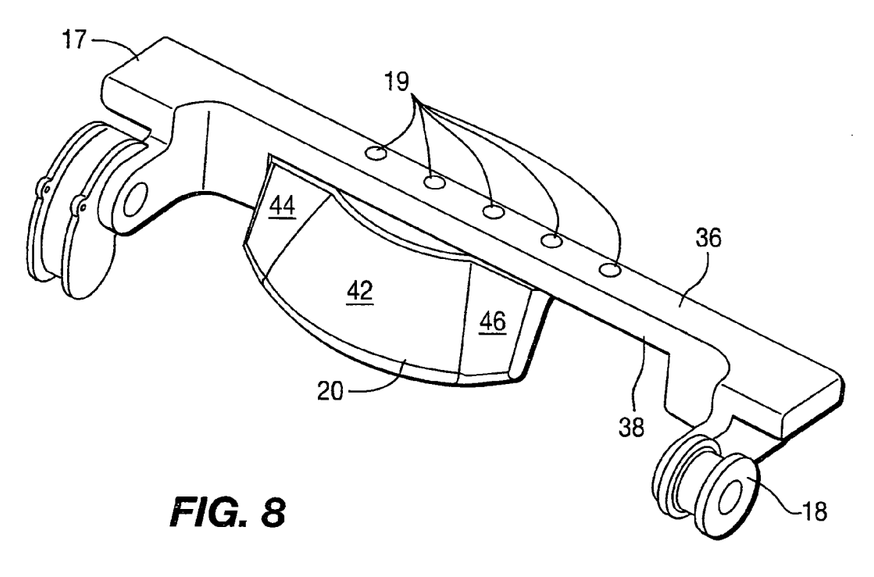
FIG. 8 is a perspective illustration of the rotatable head assembly of the present invention showing the retaining cup in the leftmost adjusted position.
Figure 9:
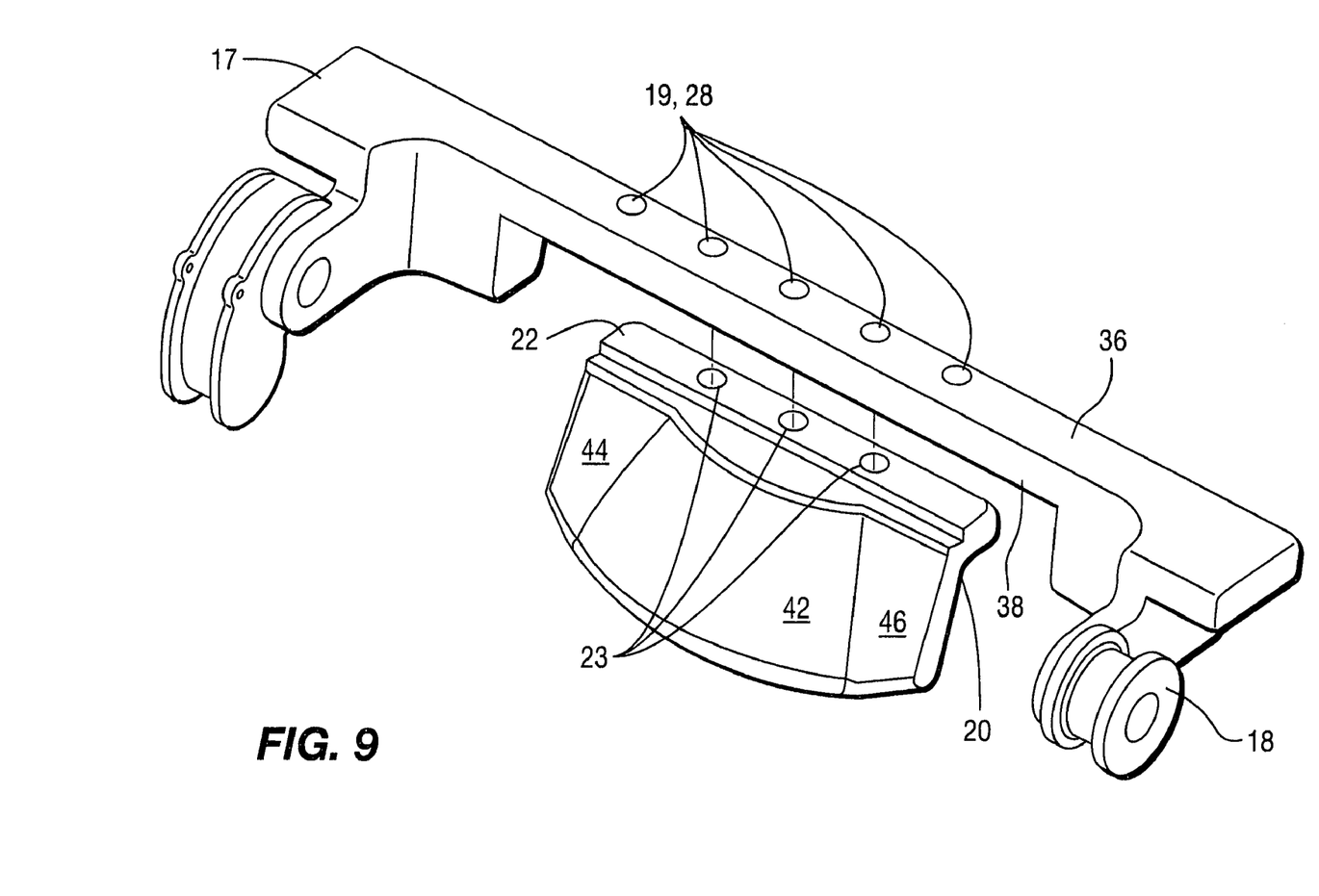
FIG. 9 is a perspective illustration of the rotatable head assembly of the present invention showing the retaining cup positioned immediately adjacent to the rotatable head member immediately prior to engagement thereof to more clearly illustrate the upper portion of the retaining cup and, in particular, the mounting block thereof.

Preferably the positioning of the retaining cup 20 with respect to the rotatable head member 18 will be adjustable. This adjustment can be provided by various means, one means of which would be the inclusion of a number of head apertures 19 defined in the rotatable head member 18 of a number greater than the number of mounting block apertures 23 in the mounting block 22 of the retaining cup 20. As seen best in FIGS. 6-9, this particular embodiment shows five specific head apertures 19 spaced apart approximately one inch from one another. On the other hand, the retaining cup 20 will include three mounting block apertures 23 defined therein as shown best in FIG. 9. As such, there will be multiple positions or orientations capable by varying which apertures of the mounting block apertures 23 are secured to which individual apertures of the head apertures 19. As seen in FIG. 7, the retaining cup 20 is secured with the three apertures thereof in alignment with the central three apertures of the five apertures 19 defined in the rotatable head member 18. However, in FIG. 8 we see that the retaining cup 20 is secured at the leftmost position with the three mounting block apertures 23 thereof secured with respect to the three leftmost of the head apertures 19. As such, one of the important characteristics of the present invention is that the number of head apertures 19 in the rotatable head member 19 is greater than the number of mounting block apertures 23 in the mounting block 22 of the retaining cup 20.

In view of the fact that the rotatable head member 18 will preferably be of aluminum material and aluminum is fairly soft, the present invention also includes the concept of positioning of threaded steel inserts 30 within the head apertures 19 of any aluminum rotatable head member 18. This minimizes wear and prevents the possibility of cross-threading.

Because of the design of the apparatus of the present invention force is exerted by the rotatable head assembly 17 against the cylindrical tank 10 positioned within the tank receiving zone 14 when moved to the closed position 34. This bias will be exerted between the abutment surface 26 of the arcuate retaining plate 24 and the cylindrical tank 10. For this purpose it is important that the manner of securement between the detachable retaining cup 20 and the rotatable head member 18 be very secure. For this purpose the construction of the rotatable head member 18 will preferably include a first structural member 36 with a second structural member 38 extending outwardly therefrom in a direction approximately perpendicularly with respect to the first structural member 36. In this manner the interior junction between the first structural member 36 and the second structural member 38 will define a head mounting groove 40 with a 90 degree angle slot therewithin. This head mounting groove 40 will be adapted to mate with and receive the mounting block 22 of the retaining cup 20. Preferably the mounting block 22 is rectangular in cross section and, as such, the mounting block 22 will be mated with and engage the head mounting groove 40 positioned between the first structural member 36 and the second structural member 38 of rotatable head member 18. This engagement with the groove 40 along with the use of the fastening means 28 will assure firm and reliable securement between the retaining cup 20 and the rotatable head member 18 despite forces or torque applied thereto to positively engage the cylindrical tank 10 within the tank receiving zone 14.

In view of these strength requirements of the biases exerted by the nylon cup 20 against the cylindrical tank 10 positioned in the zone 14, it is preferably constructed with an arcuate central section 42 and a first wing section 44 on one side thereof and a second wing section 46 on the other side thereof. Preferably the two wing sections will have less of an arc than the arc of the arcuate central section 42. In particular, the arcuate central section 42 should provide the entire abutment surface 26 of arcuate retaining plate 24. The first and second wing sections 44 and 46 will merely be structural strengthening portions extending outward laterally therefrom.

It should be appreciated that the apparatus of the present invention is particularly useful with seats having open seatbacks for holding self-contained breathing apparatus such as commonly used in the seating within the passenger compartments of fire trucks. These seatbacks 48 will preferably receive the apparatus of the present invention mounting therein such that when a fireman sits upon the vehicle seat 50 the seatback 48 will bring the cylindrical tank 10 or self-contained breathing apparatus immediately adjacent to the back of the user to facilitate donning thereof when the fire truck arrives at the fire emergency scene.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. A tank retaining apparatus for selectively holding a cylindrical tank in an inverted position including an adjustable positionable and replaceable retaining cup, said tank retaining apparatus comprising:
   A. a bracket housing means defining a tank receiving zone for selectively receiving and retaining of a cylindrical tank therein positioned inverted;
   B. a lower mounting support for receiving the upper portion of the inverted cylindrical tank therein to facilitate selective retaining thereof within said tank receiving zone, said lower mounting support being positioned immediately below said tank receiving zone;
   C. a rotatable head assembly rotatably mounted to said bracket housing means at a position above said tank receiving zone for selectively engaging and retaining of an inverted cylindrical tank therewithin, said rotatable head assembly including;
      (1) a rotatable head member rotatably secured to said bracket housing means and defining a plurality of head apertures therein;
      (2) a retaining cup detachably attached to said rotating head member and being selectively engagable with respect to an inverted cylindrical tank positioned within said tank receiving zone for selective retaining thereof therewithin, said retaining cup being adjustably attachable to said rotating head member at a plurality of different positions, said retaining cup including:
         (a) a mounting block means being selectively attachable to said rotatable head member at a plurality of different positions, said mounting block means defining a plurality of mounting block apertures therein to facilitate detachable attachment thereof with respect to said plurality of head apertures defined in said rotatable head member, said mounting block apertures being positioned to align with said head apertures to further facilitate detachable attachment therebetween, said mounting block means defining fewer mounting block apertures therein than the number of said head apertures defined in said rotatable head member to provide adjustability in the position of attachment of said retaining cup with respect to said rotatable member; and
         (b) an arcuate retaining plate attached to said mounting block extending outwardly therefrom, said arcuate retaining plate providing an abutment surface positionable in abutment with an inverted cylindrical tank positioned in said tank receiving zone for selective retaining thereof therewithin.

2. A tank retaining apparatus for selectively holding a cylindrical tank in an inverted position including an adjustable positionable and replaceable retaining cup as defined in claim 1 wherein said retaining cup is made of nylon.

3. A tank retaining apparatus for selectively holding a cylindrical tank in an inverted position including an adjustable positionable and replaceable retaining cup as defined in claim 1 wherein said retaining cup further comprises a plurality of fastening means adapted to extend through said head apertures of said rotatable head member and said mounting block apertures of said retaining cup to facilitate detachably attachment therebetween.

4. A tank retaining apparatus for selectively holding a cylindrical tank in an inverted position including an adjustable positionable and replaceable retaining cup as defined in claim 3 wherein said fastening means is male threaded to facilitate detachable engagement between said head apertures and said mounting block apertures.

5. A tank retaining apparatus for selectively holding a cylindrical tank in an inverted position including an adjustable positionable and replaceable retaining cup as defined in claim 1 wherein said head apertures of said rotatable head member are spatially disposed approximately one inch from one another and where mounting block apertures of said retaining cup are spatially disposed approximately one inch from one another.

6. A tank retaining apparatus for selectively holding a cylindrical tank in an inverted position including an adjustable positionable and replaceable retaining cup as defined in claim 1 wherein said rotatable head member of said rotatable head assembly is made of aluminum.

7. A tank retaining apparatus for selectively holding a cylindrical tank in an inverted position including an adjustable positionable and replaceable retaining cup as defined in claim 1 wherein said rotatable head member of said rotatable head assembly is made of aluminum and wherein said rotatable head member includes a plurality of threaded steel inserts extending into each of said head apertures of said rotatable head member to minimize maintenance requirements thereof.

8. A tank retaining apparatus for selectively holding a cylindrical tank in an inverted position including an adjustable positionable and replaceable retaining cup as defined in claim 1 wherein said rotatable head assembly is rotatable between an opened position with said retaining cup spatially disposed from said tank receiving zone to facilitate placement and removal of a cylindrical tank with respect thereto and a closed position with said retaining cup positioned immediately adjacent said tank receiving zone with said arcuate retaining plate positioned in abutment with a cylindrical tank positioned therewithin.

9. A tank retaining apparatus for selectively holding a cylindrical tank in an inverted position including an adjustable positionable and replaceable retaining cup as defined in claim 1 wherein said mounting block means and said arcuate retaining plate are formed integrally.

10. A tank retaining apparatus for selectively holding a cylindrical tank in an inverted position including an adjustable positionable and replaceable retaining cup as defined in claim 1 wherein said rotatable head member includes a first structural member extending longitudinally and a second structural member extending longitudinally, said second structural member extending laterally outwardly from said first structural member to define a head mounting groove extending longitudinally therealong to facilitate detachably securement of said retaining cup thereto.

11. A tank retaining apparatus for selectively holding a cylindrical tank in an inverted position including an adjustable positionable and replaceable retaining cup as defined in claim 10 wherein said mounting block means of said retaining cup is mated with and engagable with respect to said head mounting groove of said rotatable head member to facilitate detachable attachment therebetween.

12. A tank retaining apparatus for selectively holding a cylindrical tank in an inverted position including an adjustable positionable and replaceable retaining cup as defined in claim 11 wherein said second structural member extends outwardly laterally perpendicularly with respect to said first structural member and wherein said mounting block means of said retaining cup is rectangular in cross-sectional shape to facilitate engagement with said head mounting groove.

13. A tank retaining apparatus for selectively holding a cylindrical tank in an inverted position including an adjustable positionable and replaceable retaining cup as defined in claim 1 wherein said arcuate retaining plate of said retaining cup includes:
  A. an arcuate central section providing said abutment surface for selective abutment with a cylindrical tank for retaining thereof in inverted orientation within said tank retaining zone;
  B. a first wing section attached to said arcuate central section and extending outwardly therefrom, said first wing section being less arcuate than said arcuate central section and providing structural strength to said arcuate retaining plate; and
  C. a second wing section attached to said arcuate central section and extending outwardly therefrom at a position spatially disposed from said first wing section, said second wing section being less arcuate than said arcuate central section and providing structural strength to said arcuate retaining plate.

14. A tank retaining apparatus for selectively holding a cylindrical tank in an inverted position including an adjustable positionable and replaceable retaining cup as defined in claim 13 wherein said first wing section and said second wing section are both spatially disposed from a cylindrical tank positioned within said tank receiving zone.

15. A tank retaining apparatus for selectively holding a cylindrical tank in an inverted position including an adjustable positionable and replaceable retaining cup as defined in claim 1 wherein said bracket housing means is attachable with respect to a vehicle seatback to facilitate retaining of inverted cylindrical tanks therewithin.

16. A tank retaining apparatus for selectively holding a cylindrical tank in an inverted position including an adjustable positionable and replaceable retaining cup, said tank retaining apparatus comprising:
  A. a bracket housing means defining a tank receiving zone for selectively receiving and retaining of a cylindrical tank therein positioned inverted;
  B. a lower mounting support for receiving the upper portion of the inverted cylindrical tank therein to facilitate selective retaining thereof within said tank receiving zone, said lower mounting support being positioned immediately below said tank receiving zone;
  C. a rotatable head assembly rotatably mounted to said bracket housing means at a position above said tank receiving zone for selectively engaging and retaining of an inverted cylindrical tank therewithin, said rotatable head assembly being rotatable between an opened position spatially disposed from said tank receiving zone to facilitate placement and removal of a cylindrical tank with respect thereto and a closed position immediately adjacent said tank receiving zone positioned in abutment with a cylindrical tank positioned therewithin for retaining thereof, said rotatable head assembly including;
    (1) a rotatable head member of aluminum which is rotatably secured to said bracket housing means, said rotatable head member defining a plurality of head apertures defined there to facilitate detachably attachment with respect thereto, said rotatable head member including a plurality of threaded steel inserts extending into each of said head apertures of said rotatable head member to minimize maintenance requirements thereof, said rotatable head member including a first structural member extending longitudinally and a second structural member extending longitudinally, said second structural member extending laterally outwardly from said first structural member to define a head mounting groove extending longitudinally therealong to facilitate detachably securement with respect thereto;
    (2) a retaining cup made of nylon and being detachably attached to said rotating head member and being selectively engagable with respect to an inverted cylindrical tank positioned within said tank receiving zone for selective retaining thereof therewithin, said retaining cup being adjustably attachable to said rotating head member at a plurality of different positions, said retaining cup including:
      (a) a mounting block means being selectively attachable to said rotatable head member at a plurality of different positions, said mounting block means defining a plurality of mounting block apertures defined therein to facilitate detachably attachment thereof with respect to said rotatable head member, said mounting block apertures being positioned to align with said head apertures to further facilitate detachable attachment therebetween, said rotatable head member defining more head apertures than the number of mounting block apertures defined in said mounting block of said retaining cup to provide adjustability in the lateral position of attachment of said retaining cup with respect to said rotatable head member, said mounting block means of said retaining cup being mated with and engagable with respect to said head mounting groove of said rotatable head member to facilitate detachable attachment therebetween;

(b) an arcuate retaining plate attached to said mounting block extending outwardly therefrom, said arcuate retaining plate providing an abutment surface positionable in abutment with an inverted cylindrical tank positioned in said tank receiving zone for selective retaining thereof therewithin, said mounting block means and said arcuate retaining plate being integrally formed, said arcuate retaining plate of said retaining cup including:

A. an arcuate central section providing said abutment surface for selective abutment with a cylindrical tank for retaining thereof in inverted orientation within said tank retaining zone, said arcuate central section providing said abutment surface;

B. a first wing section attached to said arcuate central section and extending outwardly therefrom, said first wing section being less arcuate than said arcuate central section and providing structural strength to said arcuate retaining plate; and C. a second wing section attached to said arcuate central section and extending outwardly therefrom at a position spatially disposed from said first wing section, said second wing section being less arcuate than said arcuate central section and providing structural strength to said arcuate retaining plate; and (c) a plurality of fastening means adapted to extend through said head apertures of said rotatable head member and said mounting block apertures of said retaining cup to facilitate detachably attachment therebetween, said fastening means being male threaded to facilitate detachable engagement between said head apertures and said mounting block apertures.

* * * * *